US012103763B2

(12) United States Patent
Mata

(10) Patent No.: US 12,103,763 B2
(45) Date of Patent: Oct. 1, 2024

(54) PERFORATED SHIPPING AND DISPLAY BOX FOR PACKAGED LIGHTING ELEMENTS

(71) Applicant: Feit Electric Company, Inc., Pico Rivera, CA (US)

(72) Inventor: Jose Mata, La Puente, CA (US)

(73) Assignee: Feit Electric Company, Inc., Pico Rivera, CA (US)

( * ) Notice: Subject to any disclaimer, the term of this patent is extended or adjusted under 35 U.S.C. 154(b) by 0 days.

(21) Appl. No.: 17/525,452

(22) Filed: Nov. 12, 2021

(65) Prior Publication Data

US 2023/0150754 A1 May 18, 2023

(51) Int. Cl.

| | |
|---|---|
| ***B65D 85/42*** | (2006.01) |
| ***B31B 50/26*** | (2017.01) |
| ***B65D 5/02*** | (2006.01) |
| ***B65D 5/42*** | (2006.01) |
| ***B65D 77/04*** | (2006.01) |
| *B31B 100/00* | (2017.01) |

(52) U.S. Cl.

CPC .............. *B65D 85/42* (2013.01); *B31B 50/26* (2017.08); *B65D 5/0254* (2013.01); *B65D 5/4204* (2013.01); *B65D 5/4266* (2013.01); *B65D 77/042* (2013.01); *B31B 2100/0024* (2017.08)

(58) Field of Classification Search

CPC .... B65D 85/42; B65D 5/0254; B65D 5/4204; B65D 5/4266; B65D 77/042; B65D 71/36; B31B 50/26; B31B 2100/0024

USPC .......................................................... 206/738

See application file for complete search history.

(56) References Cited

U.S. PATENT DOCUMENTS

| | | | | |
|---|---|---|---|---|
| 3,178,242 A * | 4/1965 | Ellis | B65D 71/36 229/242 | |
| 7,073,665 B2 * | 7/2006 | Auclair | B65D 71/36 206/427 | |
| 2007/0017966 A1 * | 1/2007 | DeBusk | B65D 71/36 229/122 | |

* cited by examiner

*Primary Examiner* — Andrew D Perreault

(74) *Attorney, Agent, or Firm* — Alston & Bird LLP

(57) ABSTRACT

Various embodiments provide a shipping and display box. In example embodiments, a shipping and display box includes a bottom panel, the bottom panel comprising a distal end wall at a distal end of the bottom panel and a proximal end tab at a proximal end of the bottom panel. In embodiments, the shipping and display box further includes a first side wall adjacent to and at an approximate right angle to the bottom panel at a first crease line. The shipping and display box further includes a top panel adjacent to and at an approximate right angle to the first side wall at a second crease line, the top panel comprising a proximal end wall at a proximal end of the top panel and a distal end tab at a distal end of the top panel. In embodiments, the shipping and display box further includes a second side wall adjacent to and at an approximate right angle to the top panel at a third crease line. The bottom panel, first side wall, second side wall, top panel, and proximal end wall each comprise one or more perforations configured to enable removal of sections of each of the bottom panel, first side wall, second side wall, top panel, and proximal end wall for display of contents of the shipping and display box.

23 Claims, 5 Drawing Sheets

PERFORATED SHIPPING AND DISPLAY BOX FOR PACKAGED LIGHTING ELEMENTS

BACKGROUND

Light bulbs or other lighting elements are packaged and shipped to businesses for eventual transfer to consumers. Packaging the light bulbs in a manner that protects them from transit-related damage is challenging and expensive. Moreover, upon receipt of the packaged light bulbs, a merchant must then transfer them to a shelf or other display so that consumers may evaluate options and make selections. Such transfer can be fraught with additional damage to the light bulbs and may not always result in a consumer having appropriate visibility into what is contained in the packaging or display. Further, conventional display mechanisms may not provide for reuse of the display materials.

Through applied effort, ingenuity, and innovation, solutions to improve existing methods and apparatuses have been realized and are described in connection with embodiments of the present invention.

BRIEF SUMMARY

Various embodiments provide for a shipping and display box. In embodiments, the shipping and display box can be used for linear tube lighting elements. In example embodiments, a shipping and display box includes a bottom panel, the bottom panel comprising a distal end wall at a distal end of the bottom panel and a proximal end tab at a proximal end of the bottom panel. In embodiments, the shipping and display box further includes a first side wall adjacent to and at an approximate right angle to the bottom panel at a first crease line, the first side wall comprising a first proximal side fold-over panel at a proximal end of the first side wall and a first distal side fold-over panel at a distal end of the first side wall, wherein the first proximal side fold-over panel and the first distal side fold-over panel are substantially parallel to and facing one another.

In embodiments, the shipping and display box further includes a top panel adjacent to and at an approximate right angle to the first side wall at a second crease line, the top panel comprising a proximal end wall at a proximal end of the top panel and a distal end tab at a distal end of the top panel, wherein the top panel and the bottom panel are substantially parallel to and facing one another.

In embodiments, the shipping and display box further includes a second side wall adjacent to and at an approximate right angle to the top panel at a third crease line, the second side wall comprising a second proximal side fold-over panel at a proximal end of the second side wall and a second distal side fold-over panel at a distal end of the second side wall, wherein the second proximal side fold-over panel and the second distal side fold-over panel are substantially parallel to and facing one another, and wherein the first side wall and the second side wall are substantially parallel to and facing one another, In embodiments, the distal end wall is folded at a fourth crease line toward the top panel and secured to the distal end of the top panel by way of the distal end tab of the top panel and the proximal end wall is folded at a fifth crease line toward the bottom panel and secured to the proximal end of the bottom panel by way of the proximal end tab of the bottom panel.

In embodiments, the bottom panel, first side wall, second side wall, top panel, and proximal end wall each comprise one or more perforations configured to enable removal of sections of each of the bottom panel, first side wall, second side wall, top panel, and proximal end wall for display of contents of the shipping and display box.

BRIEF DESCRIPTION OF THE SEVERAL VIEWS OF THE DRAWING(S)

Having thus described the invention in general terms, reference will now be made to the accompanying drawings, which are not necessarily drawn to scale.

DETAILED DESCRIPTION OF VARIOUS EMBODIMENTS

Figure 1A:
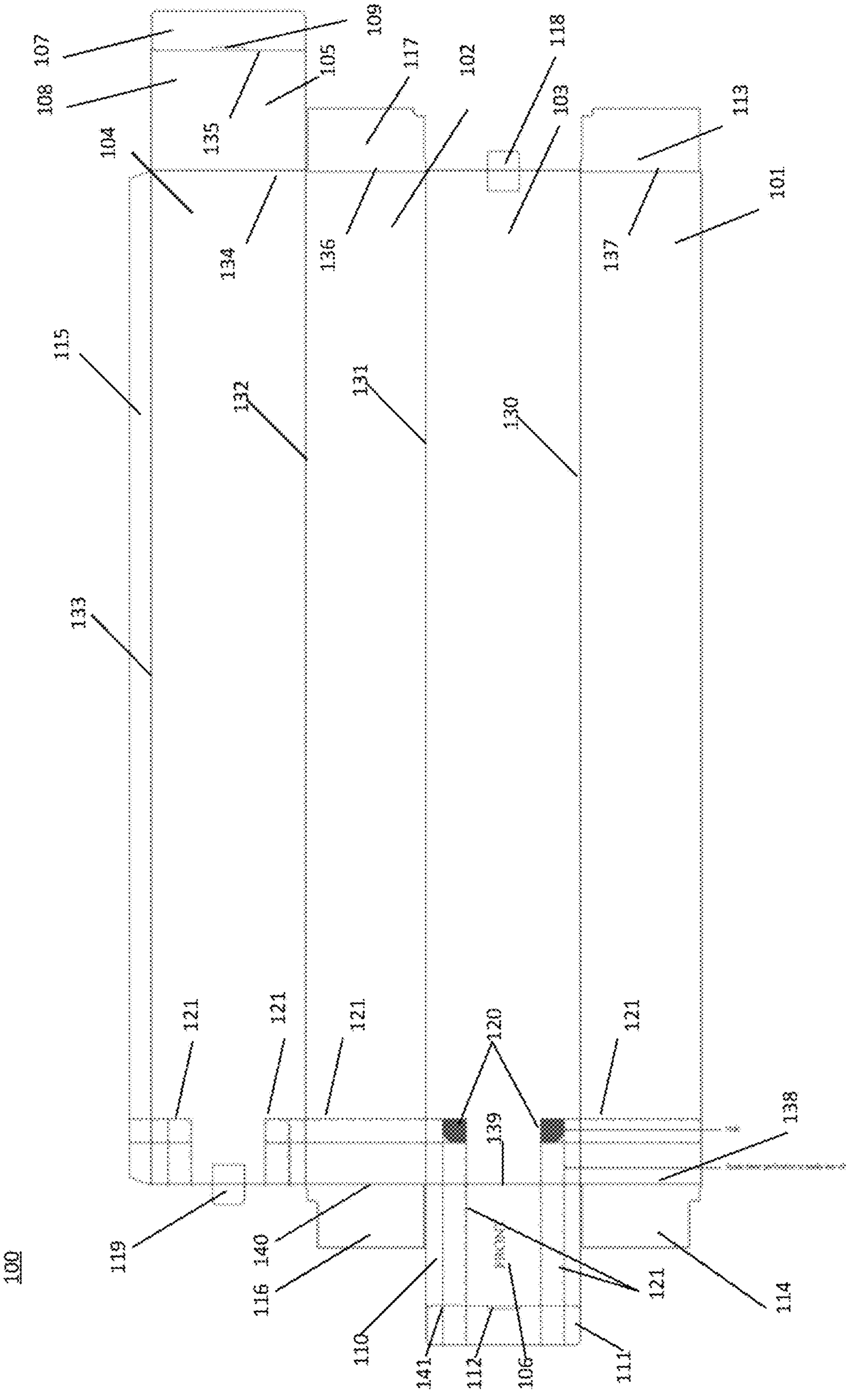
FIG. 1A shows a top view of an arrangement of an example blank used to make a shipping and display box for packaged linear tube light bulbs according to various embodiments.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Unless otherwise defined, all technical and scientific terms used herein have the same meaning as commonly understood by one of ordinary skill in the art to which this invention belongs. The terminology used in the description is for describing particular embodiments only and is not intended to be limiting to embodiments of the present invention. As used in the description, the singular forms “a,” “an,” and “the” are intended to include the plural forms as well, unless the context clearly indicates otherwise. The term “or” is used herein in both the alternative and conjunctive sense, unless otherwise indicated. The terms “illustrative” and “exemplary” are used to be examples with no indication of quality level.

Unless otherwise indicated, all numbers expressing quantities of dimensions such as length, width, height, and so forth as used in the description are to be understood as being modified in all instances by the term “about.” Accordingly, unless otherwise indicated, the numerical properties set forth in the description are approximations that may vary depending on the desired properties sought to be obtained in embodiments of the present invention. Notwithstanding that the approximate numerical ranges and parameters setting forth the broad scope of embodiments of the present invention, the numerical values set forth in the specific examples are reported as precisely as possible. Any numerical values, however, inherently contain certain errors necessarily resulting from error found in their respective measurements.

Still further, while numbers expressing quantities of dimensions such as length, width, height, and sort forth are incorporated throughout the description, such as to be understood as exemplary in nature, versus limiting. In other words, certain embodiments may have dimensions substantially greater than the exemplary numbers expressed herein, while other embodiments may have dimensions substantially less than the same, as may be desirable for particular applications. It should be understood that such variations in dimensions are contemplated and considered within the scope of various embodiments. Accordingly, for purposes of brevity of disclosure, such variations may be assumed with regard to any remaining described dimensions herein, even where not explicitly described with regard to particular panels or other elements.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Figure 1B:
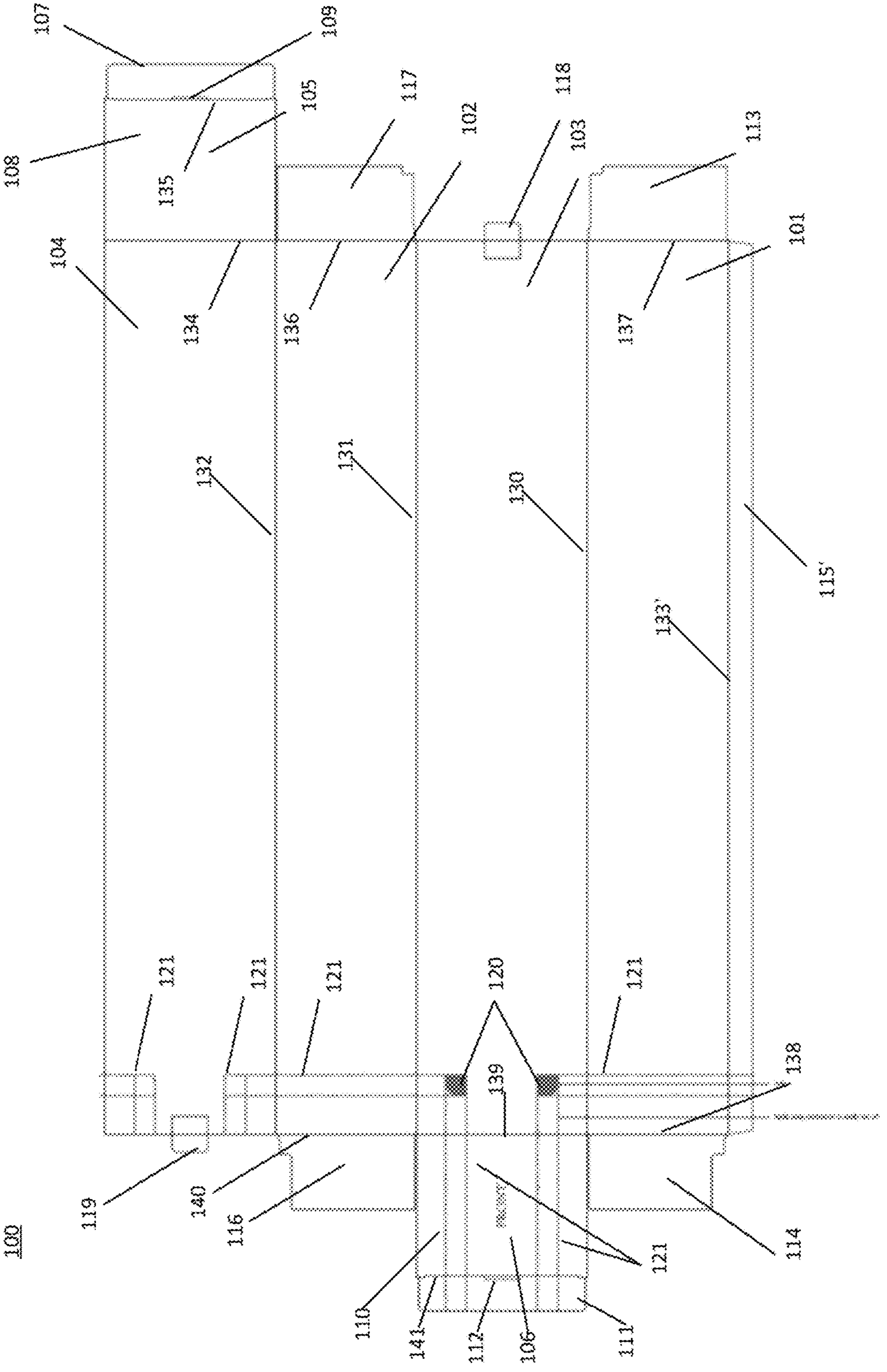
FIG. 1B shows a top view of an arrangement of an example blank used to make a shipping and display box for packaged linear tube light bulbs according to various embodiments.

FIGS. 1A and 1B provide illustrations of an example blank 100 that may be used to make an outer shipping box 200 which may, in turn, be configured to form a display system 300 for boxed linear tube light bulbs 201, according to various embodiments. In certain embodiments, the insert shipping box 200 formed by carrying out a sequence of folding steps upon the blank 100. In particular embodiments, the blank 100 is folded along appropriate formed crease lines and respective panels, walls, or flaps are thereby brought by the folding operation into proximity or juxtaposition to other panels, walls, or flaps, or made to abut or to interlock with other panels, walls, or flaps of the blank 100, as described in further detail below.

In various embodiments, the formed crease lines are configured to encourage bending at the crease lines. For instance, in various embodiments, the crease lines may be formed by placing indentations in the blank 100, by partial cuts through the body of the blank 100, by placing serrated indentations in the body of the blank 100 that include alternating sections of cuts through the body of the blank and sections without cuts, and/or combinations thereof.

For convenience, the blank 100 is shown in FIGS. 1A and 1B as a single flat item that may be manufactured as a single piece. However, it will be appreciated that the blank 100 may be manufactured in multiple pieces that may be adhered to one another through such mechanisms as tape, glue, staples, etc., and/or a combination thereof. In addition, according to various embodiments, the blank 100 may be constructed of any suitable material such as the non-limiting examples of paperboard, cardboard, corrugated cardboard, plastic, or metal. In certain embodiments, the suitable material may be formed at least partially or even wholly from recyclable, reground, and/or biodegradable material, as may be desirable in particular applications.

It may be seen from FIGS. 1A and 1B that various embodiments of the blank 100 include a first side wall 104, a top panel 102, a second side wall 103, and bottom panel 101. Each of the respective walls and panels may be substantially rectangular in shape, and dimensions for each may vary among embodiments.

For example, the overall size of a shipping box 200 or display box (e.g., or system) 300 according to embodiments herein may include a height of four (4) feet and a width of eight (8) feet. In other embodiments, the overall size may include a height of four (4) feet and a width of four (4) feet. A length or depth of the shipping box 200 or display box 300 may vary based on the packaged components intended therefor (e.g., two (2) feet or three (3) feet). The packaged components within the shipping box 200 or display box 300 may include various types of lightbulbs or other lighting elements, although embodiments herein are not limited to such components. It will be appreciated that in other embodiments, these and still other dimensions of the blank 100 may be substantially greater than or substantially less than those recited above, as may be desirable for shipping and display of certain packaged components. For purposes of brevity, such variations may be assumed with regarding to any remaining described dimensions.

A side fold-over panel 115 may be included on a first side of the first side wall 104, where the side fold-over panel 115 and the first side of the first side wall 104 are adjoined by a crease line 133. A distal end wall 105 may be included on a distal end of the first side wall 104, where the distal end wall 105 includes a first distal end wall panel 108 and a second distal end wall panel 107. The first distal end wall panel 108 is adjacent the second distal end wall panel 107 at a crease line 135. A distal aperture 109 may also be included along the crease line 135, for accepting a distal end tab 118 situated at a distal end of the second side wall 103. The distal end wall 105 is adjacent the first side wall 104 at a crease line 134.

A proximal side fold-over panel 116 and a distal side fold-over panel 117 are positioned at a proximal end and a distal end, respectively, of the top panel 102. The top panel 102 is adjacent the first side wall 104 at a crease line 132, and is adjacent the second side wall 103 at a crease line 131. The proximal side fold-over panel 116 is adjacent the top panel 102 at a crease line 140, while the distal fold-over panel 117 is adjacent the top panel 102 at a crease line 136.

A proximal side fold-over panel 114 and a distal side fold-over panel 113 are positioned at a proximal end and a distal end, respectively, of the bottom panel 101. The bottom panel 101 is adjacent the second side wall 103 at a crease line 130. The proximal side fold-over panel 114 is adjacent the bottom panel 101 at a crease line 138, while the distal fold-over panel 113 is adjacent the bottom panel 101 at a crease line 137.

A proximal end wall 106 may be included on a proximal end of the second side wall 103, where the proximal end wall 106 includes a first proximal end wall panel 110 and a second proximal end wall panel 111. The first proximal end wall panel 110 is adjacent the second proximal end wall panel 111 at a crease line 141. A proximal aperture 112 may also be included along the crease line 141, for accepting a proximal end tab 119 situated at a proximal end of the first side wall 104. The proximal end wall 106 is adjacent the second side wall 103 at a crease line 139.

The blank 100 is further configured with perforations 121 and holes 120 positioned such that sections of the blank 100, after the blank 100 has been assembled into a shipping box 200, may be removed. For example, the second side wall 103 may include holes 120 and perforations extending from the holes toward one or more of the top panel 102 and first side wall 104, the bottom panel 101, or the proximal end wall 106. Removal of the sections of the shipping box 200 according to perforations 121 and holes 120 configures the shipping box 200 into a display box or system 300 for ease in displaying packaged components.

In embodiments, the proximal end of the blank 100 may constitute a front or display side of the shipping box 200 or display box 300 while the distal end of the blank 100 may constitute a rear side of the shipping box 200 or display box 300. Further, the top panel may constitute a top or upper portion of the shipping box 200 or display box 300, while the bottom panel may constitute a bottom or lower portion of the shipping box 200 or display box 300. However, it will be appreciated that references to front or rear, top or bottom, are not intended to be limiting herein.

With reference to FIG. 1B, an alternative embodiment of the blank includes a side fold-over panel 115' included on a first side of the bottom panel 101 (e.g., as opposed to the first side wall 104 as shown in FIG. 1A). In such embodiments, the side fold-over panel 115' and the first side of the bottom panel 101 are adjoined by a crease line 133'.

Figure 2A:
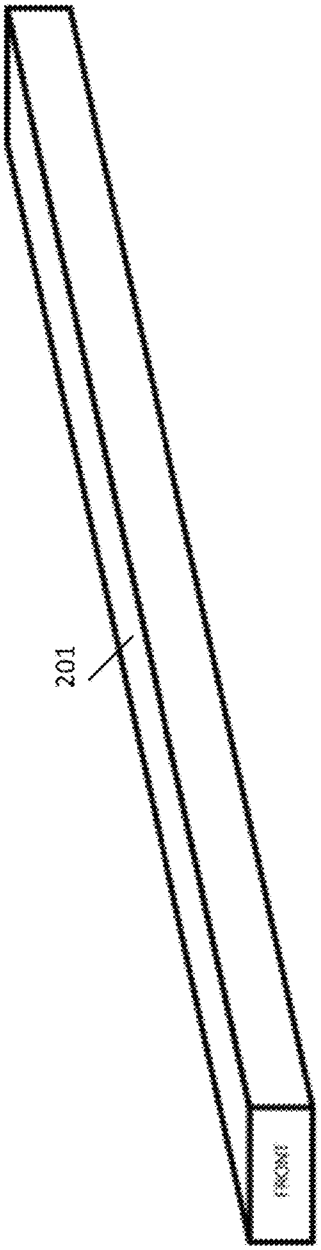
FIG. 2A shows an example packaged linear tube light bulb according to various embodiments.
Figure 2B:
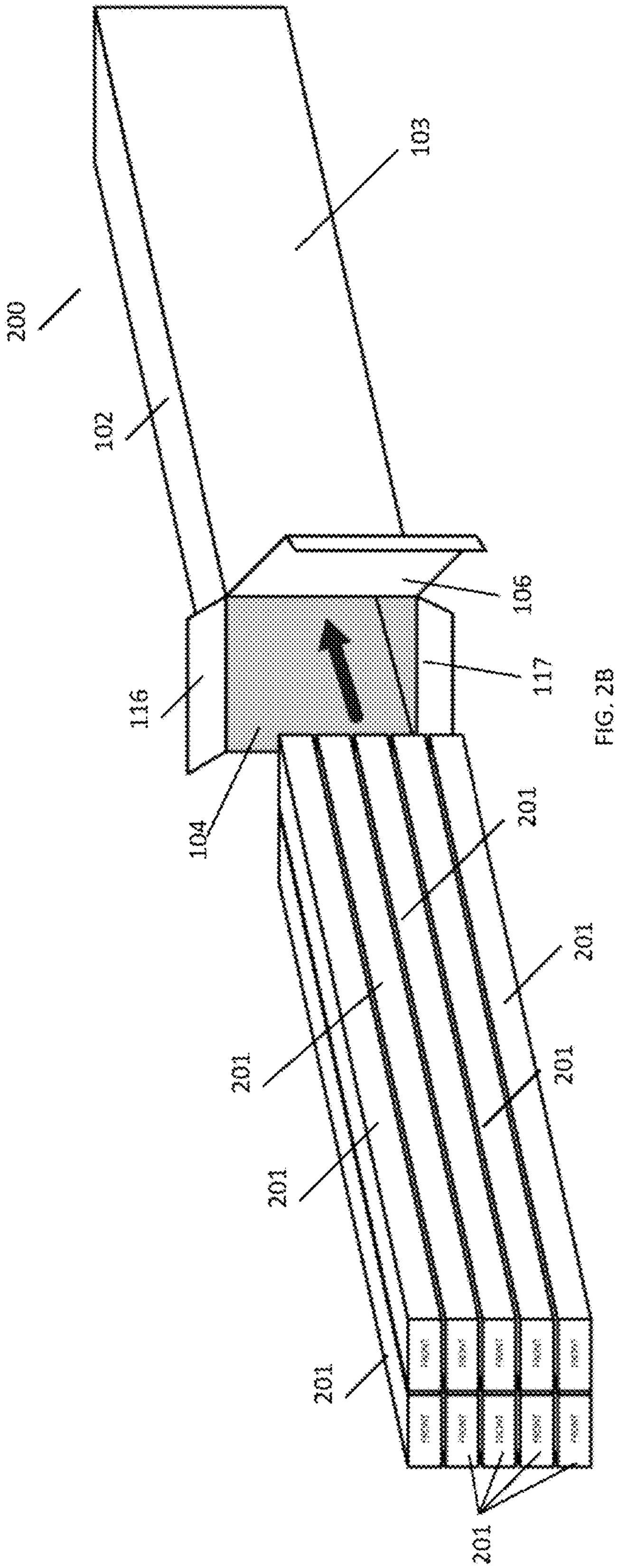
FIG. 2B shows an example assembled shipping box configured for receiving a plurality of packaged linear tube light bulbs according to various embodiments.

The shipping box 200 (not shown in FIGS. 1A and 1B but shown in FIG. 2B) may be formed by a series of folding operations. For example, the first side wall 104 may be folded along crease line 132 between the first side wall 104 and the top panel 102 at an approximate right angle, and then the second side wall 103 may be folded along crease line 131 between the top panel 102 and the second side wall 103 at an approximate right angle such that the first side wall 104 and the second side wall 103 are substantially parallel to and facing one another.

The bottom panel 101 may also then be folded along crease line 130 between the second side wall 103 and the bottom panel 101 at an approximate right angle such that the top panel 102 and the bottom panel 101 are substantially parallel to and facing one another.

Proximal side fold-over panel 116 may be folded along crease line 140 between proximal side fold-over panel 116 and top panel 102 at an approximate right angle, and distal side fold-over panel 117 may be folded along crease line 136 between distal side fold-over panel 117 and top panel 102 at an approximate right angle such that the proximal side fold-over panel 116 and distal side fold-over panel 117 are substantially parallel to and facing one another.

Proximal side fold-over panel 114 may be folded along crease line 138 between proximal side fold-over panel 114 and bottom panel 101 at an approximate right angle, and distal side fold-over panel 113 may be folded along crease line 137 between distal side fold-over panel 113 and bottom panel 101 at an approximate right angle such that the proximal side fold-over panel 114 and distal side fold-over panel 113 are substantially parallel to and facing one another.

Distal end wall 105 may be folded along crease line 134 between first distal end wall panel 108 and the first side wall 104 at an approximate right angle. The second distal wall end panel 107 may be folded at crease line 135 between first distal end wall panel 108 and second distal end wall panel 107 at an approximate right angle.

Second distal end wall panel 107 may be positioned such that it is tucked into an opening inside the second side panel 103, and distal end tab 118 is inserted into distal end aperture 109 to secure distal end wall 105 in place.

In embodiments as shown in FIG. 1A, side fold-over panel 115 is folded at crease line 133 at an approximate right angle and secured to bottom panel 101. In embodiments as shown in FIG. 1B, side fold-over panel 115' is folded at crease line 133' at an approximate right angle and secured to first side panel 104. The side fold-over panel (e.g., 115 or 115') may be secured through such mechanisms as tape, glue, staples, etc., and/or a combination thereof.

In some embodiments, at this point in the assembly process, packaged components may be loaded into a cavity formed within the shipping box 200 before the proximal end wall 106 is closed. Further, it will be appreciated that proximal side fold-over panels 116 and 114 may be folded after the packaged components are loaded into the cavity, instead of before.

Proximal end wall 106 may be folded along crease line 139 between first proximal end wall panel 110 and the second side wall 103 at an approximate right angle. The second proximal wall end panel 111 may be folded at crease line 141 between first proximal end wall panel 110 and second proximal end wall panel 111 at an approximate right angle.

Second proximal end wall panel 111 may be positioned such that it is tucked into an opening inside the first side panel 104, and proximal end tab 119 is inserted into proximal end aperture 112 to secure proximal end wall 106 in place.

Exemplary Use of Linear Tube Tray

Figure 3B:
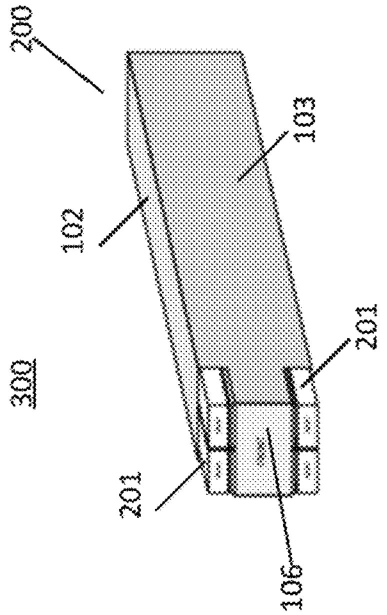
FIG. 3B shows an example assembled shipping box configured as a display box for a plurality of packaged linear tube light bulbs.
Figure 3A:
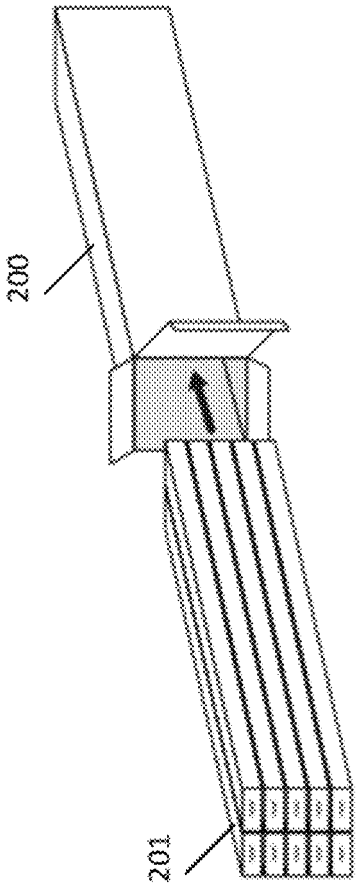
FIG. 3A shows an example assembled shipping box configured for receiving a plurality of packaged linear tube light bulbs according to various embodiments.

Subsequent to transport of the shipping box 200 (e.g., filled with packaged components 201, shown in FIGS. 2A, 2B, and 3A), sections of the shipping box 200 may be removed according to the holes and perforations (e.g., 120, 121) of the blank 100.

Shown in FIGS. 1A and 1B, the blank 100 has been configured to include perforations 121 on each of the first side wall 104, the top panel 102, the second side wall 103, the bottom panel, and the proximal end wall 106 (e.g., including both the first proximal end wall panel 110 and second proximal end wall panel 112). Additionally, the second side wall 103 includes punctures or holes at an intersection of perforations 121 (e.g., at a first intersection of perforations 121 configured in a direction toward proximal end wall 106 and a direction toward top panel 102; at a second intersection of perforations 121 configured in a direction toward proximal end wall 106 and a direction toward bottom panel 101).

Figure 4:
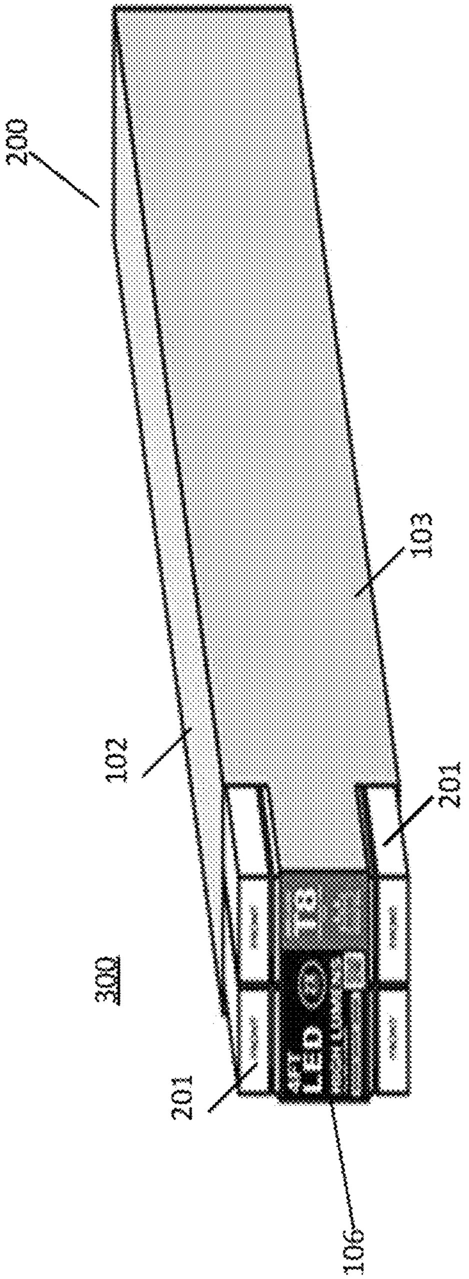
FIG. 4 shows an example assembled shipping box configured as a display box for a plurality of packaged linear tube light bulbs.

Sections of the blank 100 may be removed, subsequent to assembly into shipping box 200, according to the perforations so that the contents (e.g., plurality of packaged components 201) of the display box 300 (e.g., see FIGS. 3B and 4) may be easily viewed. Moreover, with reference to FIG. 4, one or more individually packaged components 201 may be temporarily removed from the display box 300 and then placed back into the display box 300 with ease via one or more openings resulting from the shipping box 200.

In various embodiments, display box 300 may include descriptive contents on an exterior of the proximal end wall 106 for providing information regarding the contents of the display box 300.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A shipping and display box, comprising:

a first side wall, the first side wall comprising a distal end wall at a distal end of the first side wall and a proximal end tab at a proximal end of the first side wall;

a top panel adjacent to and at an approximate right angle to the first side wall at a first crease line, the top panel comprising a first proximal side fold-over panel at a proximal end of the top panel and a first distal side fold-over panel at a distal end of the top panel, wherein the first proximal side fold-over panel and the first distal side fold-over panel are substantially parallel to and facing one another;

a second side wall adjacent to and at an approximate right angle to the top panel at a second crease line, the second side wall comprising a proximal end wall at a proximal end of the second side wall and a distal end tab at a distal end of the second side wall, wherein the first side wall and the second side wall are substantially parallel to and facing one another; and a bottom panel adjacent to and at an approximate right angle to the second side wall at a third crease line, the bottom panel comprising a second proximal side fold-over panel at a proximal end of the bottom panel and a second distal side fold-over panel at a distal end of the bottom panel, wherein the second proximal side fold-over panel and the second distal side fold-over panel are substantially parallel to and facing one another, and wherein the top panel and the bottom panel are substantially parallel to and facing one another, wherein:

the distal end wall is folded at a fourth crease line toward the second side wall and secured to the distal end of the second side wall by way of the distal end tab of the second side wall and the proximal end wall is folded at a fifth crease line toward the first side wall and secured to the proximal end of the first side wall by way of the proximal end tab of the first side wall, the bottom panel, first side wall, second side wall, top panel, and proximal end wall each comprise one or more perforations configured to enable removal of at least two non-contiguous sections of the proximal end wall and at least a section of each of the bottom panel, first side wall, second side wall, and top panel for display of contents of the shipping and display box, the one or more perforations include two spaced apart perforations that each extend entirely across the proximal end wall and onto the second side wall, and each of the two spaced apart perforations lie on a respective plane, each respective plane being parallel with the top panel.

2. The shipping and display box of claim 1, further comprising:

a side fold-over panel adjacent to and at an approximate right angle to the bottom panel at a sixth crease line on a side of the bottom panel opposite the second side wall, wherein the side fold-over panel is secured to the first side wall.

3. The shipping and display box of claim 2, wherein the side fold-over panel is secured to the first side wall using one or more of tape, glue, or staples.

4. The shipping and display box of claim 1, further comprising:

a side fold-over panel adjacent to and at an approximate right angle to the first side wall at a sixth crease line on a side of the first side wall opposite the top panel, wherein the side fold-over panel is secured to the bottom panel.

5. The shipping and display box of claim 4, wherein the side fold-over panel is secured to the bottom panel using one or more of tape, glue, or staples.

6. The shipping and display box of claim 1, wherein the shipping and display box is manufactured from a single piece of material.

7. The shipping and display box of claim 6, wherein the material comprises one or more of cardboard, corrugated cardboard, plastic, or metal.

8. The shipping and display box of claim 1, further comprising a length dimension, a height dimension, and a width dimension.

9. The shipping and display box of claim 8, wherein the height dimension is approximately four (4) feet.

10. The shipping and display box of claim 8, wherein the width dimension is one of four (4) feet or eight (8) feet.

11. The shipping and display box of claim 8, wherein the length dimension is one of two (2) or three (3) feet.

12. A blank configured to be used to form a shipping and display box, the blank comprising:

a first side wall, the first side wall comprising a distal end wall at a distal end of the first side wall and a proximal end tab at a proximal end of the first side wall;

a top panel adjacent to and configured to bend at an approximate right angle to the first side wall at a first crease line, the top panel comprising a first proximal side fold-over panel at a proximal end of the top panel and a first distal side fold-over panel at a distal end of the top panel, wherein the first proximal side fold-over panel and the first distal side fold-over panel are configured to fold to be substantially parallel to and facing one another;

a second side wall adjacent to and configured to bend at an approximate right angle to the top panel at a second crease line, the second side wall comprising a proximal end wall at a proximal end of the second side wall and a distal end tab at a distal end of the second side wall, wherein the first side wall and the second side wall are configured to fold to be substantially parallel to and facing one another; and a bottom panel adjacent to and configured to fold at an approximate right angle to the second side wall at a third crease line, the bottom panel comprising a second proximal side fold-over panel at a proximal end of the bottom panel and a second distal side fold-over panel at a distal end of the bottom panel, wherein the second proximal side fold-over panel and the second distal side fold-over panel are configured to fold to be substantially parallel to and facing one another, and wherein the top panel and the bottom panel are configured to fold to be substantially parallel to and facing one another, wherein:

the distal end wall is configured to be folded at a fourth crease line toward the second side wall and secured to the distal end of the second side wall by way of the distal end tab of the second side wall and the proximal end wall is configured to be folded at a fifth crease line toward the first side wall and secured to the proximal end of the first side wall by way of the proximal end tab of the first side wall, the bottom panel, first side wall, second side wall, top panel, and proximal end wall each comprise one or more perforations configured to enable removal of at least two non-contiguous sections of the proximal end wall and at least a section of each of the bottom panel, first side wall, second side wall, and top panel, and the one or more perforations include two spaced apart perforations that each extend entirely across the proximal end wall and onto the second side wall, each of the two spaced apart perforations being aligned parallel with one another and with the second crease line.

13. The blank of claim 12, further comprising:

a side fold-over panel adjacent to and configured to fold at an approximate right angle to the bottom panel at a sixth crease line on a side of the bottom panel opposite the second side wall.

14. The blank of claim 13, wherein the side fold-over panel is secured to the first side wall using one or more of tape, glue, or staples.

15. The blank of claim 12, further comprising:

a side fold-over panel adjacent to and configured to fold at an approximate right angle to the first side wall at a sixth crease line on a side of the first side wall opposite the top panel, wherein the side fold-over panel is secured to the bottom panel.

16. The blank of claim 15, wherein the side fold-over panel is secured to the bottom panel using one or more of tape, glue, or staples.

17. The blank of claim 12, wherein the blank is manufactured from a single piece of material.

18. The blank of claim 17, wherein the material comprises one or more of cardboard, corrugated cardboard, plastic, or metal.

19. The blank of claim 12, further comprising a length dimension, a height dimension, and a width dimension.

20. The blank of claim 19, wherein one or more of:

the height dimension is approximately four (4) feet;

the width dimension is one of four (4) feet or eight (8) feet; or the length dimension is one of two (2) or three (3) feet.

21. A method for making a shipping and display box, wherein the shipping and display box comprises:

a first side wall, the first side wall comprising a distal end wall at a distal end of the first side wall and a proximal end tab at a proximal end of the first side wall;

a top panel adjacent to and configured to bend at an approximate right angle to the first side wall at a first crease line, the top panel comprising a first proximal side fold-over panel at a proximal end of the top panel and a first distal side fold-over panel at a distal end of the top panel, wherein the first proximal side fold-over panel and the first distal side fold-over panel are configured to fold to be substantially parallel to and facing one another;

a second side wall adjacent to and configured to bend at an approximate right angle to the top panel at a second crease line, the second side wall comprising a proximal end wall at a proximal end of the second side wall and a distal end tab at a distal end of the second side wall, wherein the first side wall and the second side wall are configured to fold to be substantially parallel to and facing one another; and a bottom panel adjacent to and configured to fold at an approximate right angle to the second side wall at a third crease line, the bottom panel comprising a second proximal side fold-over panel at a proximal end of the bottom panel and a second distal side fold-over panel at a distal end of the bottom panel, wherein the second proximal side fold-over panel and the second distal side fold-over panel are configured to fold to be substantially parallel to and facing one another, and wherein the top panel and the bottom panel are configured to fold to be substantially parallel to and facing one another, wherein:

the distal end wall is configured to be folded at a fourth crease line toward the second side wall and secured to the distal end of the second side wall by way of the distal end tab of the second side wall and the proximal end wall is configured to be folded at a fifth crease line toward the first side wall and secured to the proximal end of the first side wall by way of the proximal end tab of the first side wall, the bottom panel, first side wall, second side wall, top panel, and proximal end wall each comprise one or more perforations configured to enable removal of at least two non-contiguous sections of the proximal end wall and at least a section of each of the bottom panel, first side wall, second side wall, and top panel, and the one or more perforations include two spaced apart perforations that each extend entirely across the proximal end wall and onto the second side wall, each of the two spaced apart perforations being aligned parallel with one another and with the second crease line, the method comprising:

folding the first side wall at the first crease line at an approximate right angle;

folding the top panel at the second crease line at an approximate right angle;

folding the second side wall at the third crease line at an approximate right angle such that the first side wall and the second side wall are substantially parallel to and facing one another and such that the top panel and the bottom panel are substantially parallel to and facing one another;

folding the first proximal side fold-over panel and first distal side fold-over panels toward one another such that they are substantially parallel to and facing one another;

folding the second proximal side fold-over panel and second distal side fold-over panels toward one another such that they are substantially parallel to and facing one another;

folding the distal end wall toward the proximal end of the first side wall at an approximate right angle and securing the distal end wall to the second side wall using the distal end tab of the second side wall; and folding the proximal end wall toward the distal end of the second side wall at an approximate right angle and securing the proximal end wall to the first side wall using the proximal end tab of the first side wall.

22. The method of claim 21, further comprising:

prior to folding the proximal end wall toward the distal end of the second side wall at an approximate right angle and securing the proximal end wall to the first side wall using the proximal end tab of the first side wall, loading packaged components into a cavity of the shipping and display box.

23. The method of claim 22, further comprising:

removing sections of the bottom panel, first side wall, second side wall, top panel, and proximal end wall according to the one or more perforations thereof such that one or more packaged components within the cavity are visible from an exterior of the shipping and display box.

* * * * *